United States Patent
Kallakuri et al.

(10) Patent No.: US 10,855,753 B2
(45) Date of Patent: Dec. 1, 2020

(54) DISTRIBUTED COMPUTING OF VEHICLE DATA BY SELECTING A COMPUTATION RESOURCE OF A REMOTE SERVER THAT SATISFIES A SELECTION POLICY FOR MEETING RESOURCE REQUIREMENTS ACCORDING TO CAPABILITY INFORMATION

(71) Applicant: STANDARD COGNITION, CORP., San Francisco, CA (US)

(72) Inventors: Nagasrikanth Kallakuri, San Francisco, CA (US); Akshay Goel, San Francisco, CA (US); Tushar Dadlani, Pleasanton, CA (US)

(73) Assignee: STANDARD COGNITION, CORP., San Francisco, CA (US)

( * ) Notice: Subject to any disclaimer, the term of this patent is extended or adjusted under 35 U.S.C. 154(b) by 88 days.

(21) Appl. No.: 15/904,277

(22) Filed: Feb. 23, 2018

(65) Prior Publication Data
US 2019/0268402 A1    Aug. 29, 2019

(51) Int. Cl.
*H04L 29/08* (2006.01)
*G06F 9/50* (2006.01)
(Continued)

(52) U.S. Cl.
CPC ......... *H04L 67/101* (2013.01); *G06F 9/5027* (2013.01); *H04L 67/125* (2013.01);
(Continued)

(58) Field of Classification Search
CPC ..... H04L 67/101; H04L 67/125; H04L 67/18; H04L 67/289; H04L 69/24; G06F 9/5027;
(Continued)

(56) References Cited

U.S. PATENT DOCUMENTS 5,657,317 A * 8/1997 Mahany ............... G06F 1/1626
370/338
5,696,903 A * 12/1997 Mahany ............... H04L 1/0025
709/228

(Continued)

OTHER PUBLICATIONS

U.S. Appl. No. 15/904,281—Office Action dated Jun. 26, 2019, 18 pages.

(Continued)

*Primary Examiner* — Daniel C. Murray
(74) *Attorney, Agent, or Firm* — Haynes Beffel & Wolfeld LLP; Mark A. Haynes; Andrew L. Dunlap

(57) ABSTRACT

The technology disclosed allows for remote distributed computing and storage of vehicle data obtained from one or more vehicles. Specifically, the technology disclosed is capable of determining, at a vehicle, resource requirements for a software application. The technology disclosed is also capable of selecting a computation resource from a plurality of computation resources based on one or more selection policies for meeting the resource requirements, sending the vehicle data from the vehicle to the selected computation resource, receiving at the vehicle data from the selected computation resource and utilizing the data obtained from the computation resource and data in the vehicle in the software application.

21 Claims, 6 Drawing Sheets

(51) Int. Cl.
*H04L 29/06* (2006.01)
*H04W 4/02* (2018.01)
*H04W 4/021* (2018.01)
*H04W 4/44* (2018.01)

(52) U.S. Cl.
CPC ............ *H04L 67/18* (2013.01); *H04L 67/289* (2013.01); *H04L 69/24* (2013.01); *H04W 4/021* (2013.01); *H04W 4/023* (2013.01); *H04W 4/44* (2018.02); *G06F 2209/509* (2013.01)

(58) Field of Classification Search
CPC . G06F 2209/509; H04W 4/023; H04W 4/021; H04W 4/44
See application file for complete search history.

(56) References Cited

U.S. PATENT DOCUMENTS

| | | | |
|---|---|---|---|
| 6,842,786 B1 | 1/2005 | Webb | |
| 6,928,264 B2 | 8/2005 | Botteck | |
| 6,970,869 B1* | 11/2005 | Slaughter | G06F 9/5055 |
| 7,020,701 B1 | 3/2006 | Gelvin et al. | |
| 7,092,985 B2 | 8/2006 | Hubbard | |
| 8,005,505 B2* | 8/2011 | Parry | H04W 88/06 455/556.1 |
| 8,145,765 B2* | 3/2012 | Swildens | G06F 9/50 370/252 |
| 8,230,426 B2* | 7/2012 | Powers | H04L 67/10 718/102 |
| 8,331,294 B2* | 12/2012 | MacInnis | H04W 84/12 370/329 |
| 8,467,324 B2* | 6/2013 | Yousefi | H04N 7/183 370/310.2 |
| 8,549,096 B2* | 10/2013 | Gulley | G06F 9/5027 709/216 |
| 8,750,306 B2* | 6/2014 | Yousefi | H04N 7/183 370/392 |
| 8,804,734 B2* | 8/2014 | Yousefi | H04N 7/183 370/392 |
| 8,930,541 B2* | 1/2015 | Assuncao | G06F 9/50 709/226 |
| 8,934,435 B2* | 1/2015 | MacInnis | H04W 12/06 370/329 |
| 8,976,744 B2* | 3/2015 | Yousefi | H04N 7/183 370/329 |
| 9,002,930 B1 | 4/2015 | Want et al. | |
| 9,037,897 B2* | 5/2015 | Gopinath | G06F 11/1482 714/4.11 |
| 9,038,083 B2* | 5/2015 | Huang | G06F 9/45558 718/104 |
| 9,077,586 B2* | 7/2015 | Yousefi | H04N 7/183 |
| 9,180,783 B1* | 11/2015 | Penilla | G06Q 10/20 |
| 9,215,124 B2* | 12/2015 | Yousefi | H04N 7/183 |
| 9,258,173 B2* | 2/2016 | Yousefi | H04N 7/183 |
| 9,332,261 B2* | 5/2016 | Yousefi | H04N 7/183 |
| 9,374,276 B2 | 6/2016 | Batrouni et al. | |
| 9,479,453 B2* | 10/2016 | Yousefi | H04N 7/183 |
| 9,621,477 B2* | 4/2017 | Hwang | H04L 67/02 |
| 9,781,195 B2 | 10/2017 | Ahn et al. | |
| 9,813,354 B2* | 11/2017 | Yousefi | H04N 7/183 |
| 9,967,172 B2* | 5/2018 | Kao | H04B 7/18506 |
| 9,985,907 B2* | 5/2018 | Yousefi | H04N 7/183 |
| 10,021,041 B2* | 7/2018 | Yousefi | H04N 7/183 |
| 10,447,818 B2* | 10/2019 | Yip | G06F 3/04842 |
| 10,476,969 B2* | 11/2019 | Singhal | H04L 67/025 |
| 10,491,692 B1* | 11/2019 | Feiguine | H04L 67/16 |
| 10,581,689 B2* | 3/2020 | Moguel | H04L 43/06 |
| 10,616,340 B2* | 4/2020 | Kallakuri | H04L 67/1097 |
| 10,750,339 B2* | 8/2020 | Prabhudeva | H04L 67/1008 |
| 10,775,783 B2* | 9/2020 | Lawler | B60W 50/14 |
| 2002/0036987 A1* | 3/2002 | Garcia-Luna-Aceves | H04L 45/02 370/238 |
| 2002/0052719 A1 | 5/2002 | Alexander et al. | |
| 2002/0143855 A1* | 10/2002 | Traversat | H04L 29/06 709/202 |
| 2003/0054765 A1* | 3/2003 | Botteck | H04W 4/00 455/41.1 |
| 2003/0161327 A1 | 8/2003 | Vlodavsky et al. | |
| 2005/0114760 A1 | 5/2005 | Arregui et al. | |
| 2005/0193135 A1 | 9/2005 | Owen et al. | |
| 2005/0251580 A1 | 11/2005 | Tu | |
| 2007/0050240 A1* | 3/2007 | Belani | G06Q 30/0284 705/13 |
| 2008/0163231 A1* | 7/2008 | Breen | G06Q 10/06 718/104 |
| 2009/0022092 A1* | 1/2009 | MacInnis | H04W 76/10 370/328 |
| 2009/0116430 A1* | 5/2009 | Bonta | H04W 84/18 370/329 |
| 2009/0259720 A1 | 10/2009 | Heins et al. | |
| 2010/0030810 A1 | 2/2010 | Marr | |
| 2010/0061272 A1* | 3/2010 | Veillette | H04L 45/34 370/254 |
| 2010/0229108 A1 | 9/2010 | Gerson et al. | |
| 2010/0272258 A1* | 10/2010 | Sadovsky | G06F 9/5027 380/255 |
| 2010/0285781 A1 | 11/2010 | Dai et al. | |
| 2011/0006913 A1* | 1/2011 | Chen | G08G 1/161 340/902 |
| 2011/0145374 A1 | 6/2011 | Lee | |
| 2011/0201280 A1* | 8/2011 | Dolfini | H04L 67/18 455/67.11 |
| 2011/0320520 A1* | 12/2011 | Jain | G06F 9/5072 709/203 |
| 2012/0042000 A1 | 2/2012 | Heins et al. | |
| 2012/0042327 A1 | 2/2012 | Gokhale et al. | |
| 2012/0060100 A1 | 3/2012 | Sherwood et al. | |
| 2012/0102098 A1* | 4/2012 | Guillou | G06F 9/5083 709/203 |
| 2012/0105637 A1* | 5/2012 | Yousefi | H04N 7/183 348/148 |
| 2012/0106446 A1* | 5/2012 | Yousefi | H04N 7/183 370/328 |
| 2012/0106549 A1* | 5/2012 | Yousefi | H04N 7/183 370/392 |
| 2012/0106653 A1* | 5/2012 | Yousefi | H04N 7/183 375/240.25 |
| 2012/0109406 A1* | 5/2012 | Yousefi | H04N 7/183 701/1 |
| 2012/0109446 A1* | 5/2012 | Yousefi | H04N 7/183 701/29.3 |
| 2012/0109447 A1* | 5/2012 | Yousefi | H04N 7/183 701/32.2 |
| 2012/0185558 A1 | 7/2012 | Ryder | |
| 2012/0185569 A1 | 7/2012 | Das et al. | |
| 2012/0218883 A1* | 8/2012 | Xu | H04L 65/4061 370/225 |
| 2012/0271953 A1* | 10/2012 | Gulley | G06F 9/5055 709/226 |
| 2012/0327840 A1* | 12/2012 | Chen | G08G 1/163 370/315 |
| 2013/0054763 A1 | 2/2013 | Van der Merwe et al. | |
| 2013/0081005 A1 | 3/2013 | Gounares et al. | |
| 2013/0094401 A1* | 4/2013 | MacInnis | H04W 84/12 370/254 |
| 2013/0159550 A1* | 6/2013 | Vasseur | H04W 40/248 709/242 |
| 2013/0188513 A1* | 7/2013 | Vasseur | H04W 40/248 370/254 |
| 2013/0250933 A1* | 9/2013 | Yousefi | H04N 7/183 370/338 |
| 2013/0325407 A1 | 12/2013 | Lee | |
| 2013/0339605 A1 | 12/2013 | Factor et al. | |
| 2014/0036728 A1* | 2/2014 | An | H04W 40/02 370/254 |
| 2014/0122558 A1 | 5/2014 | Azar | |
| 2014/0122725 A1 | 5/2014 | Batrouni et al. | |
| 2014/0143355 A1 | 5/2014 | Berdis et al. | |

(56) References Cited

U.S. PATENT DOCUMENTS

| | | | |
|---|---|---|---|
| 2014/0211803 A1* | 7/2014 | Yousefi | H04N 7/183 370/392 |
| 2014/0237120 A1* | 8/2014 | Hwang | G06F 9/5044 709/226 |
| 2014/0237477 A1* | 8/2014 | Cadambi | G06F 9/5044 718/103 |
| 2014/0258376 A1 | 9/2014 | Haddad et al. | |
| 2015/0002308 A1* | 1/2015 | Walley | H04Q 9/00 340/870.01 |
| 2015/0006616 A1* | 1/2015 | Walley | H04L 67/16 709/203 |
| 2015/0052214 A1 | 2/2015 | Zhao et al. | |
| 2015/0065142 A1* | 3/2015 | Song | H04W 36/00837 455/437 |
| 2015/0087227 A1* | 3/2015 | MacInnis | H04W 76/10 455/39 |
| 2015/0150086 A1* | 5/2015 | Clark | G16H 10/60 726/3 |
| 2015/0156279 A1 | 6/2015 | Vaswani et al. | |
| 2015/0156280 A1 | 6/2015 | Vaswani et al. | |
| 2015/0163819 A1* | 6/2015 | Yousefi | H04N 7/183 370/329 |
| 2015/0205818 A1 | 7/2015 | Darcy | |
| 2015/0326488 A1* | 11/2015 | Yousefi | H04N 7/183 370/417 |
| 2015/0327028 A1* | 11/2015 | Zhang | H04W 4/12 455/452.1 |
| 2015/0358810 A1 | 12/2015 | Chao et al. | |
| 2015/0365664 A1* | 12/2015 | Yousefi | H04N 7/183 375/240.02 |
| 2016/0016523 A1* | 1/2016 | Yousefi | H04N 7/183 370/401 |
| 2016/0117928 A1* | 4/2016 | Hodges | G07C 5/008 701/99 |
| 2016/0119410 A1* | 4/2016 | Ahn | H04L 67/10 455/500 |
| 2016/0134562 A1* | 5/2016 | Yousefi | H04N 7/183 370/345 |
| 2016/0198485 A1* | 7/2016 | Yousefi | H04N 7/183 370/329 |
| 2016/0294839 A1 | 10/2016 | Walline et al. | |
| 2016/0294872 A1 | 10/2016 | Walline et al. | |
| 2016/0294918 A1 | 10/2016 | Walline et al. | |
| 2016/0337441 A1* | 11/2016 | Bloomquist | H04L 67/2828 |
| 2016/0360560 A1 | 12/2016 | Jiang et al. | |
| 2017/0228221 A1* | 8/2017 | Ohmert | G06F 8/40 |
| 2017/0280102 A1* | 9/2017 | Burke | H04N 21/2181 |
| 2018/0137692 A1* | 5/2018 | Ohmert | G06F 8/65 |
| 2018/0189137 A1 | 7/2018 | De Keyser et al. | |
| 2018/0278546 A1* | 9/2018 | Yousefi | H04N 7/183 |
| 2018/0300964 A1* | 10/2018 | Lakshamanan | G07C 5/008 |
| 2018/0302338 A1* | 10/2018 | Yousefi | H04N 7/183 |
| 2018/0317067 A1* | 11/2018 | Ameixieira | H04W 4/46 |
| 2018/0338001 A1* | 11/2018 | Pereira Cabral | H04L 67/12 |
| 2018/0376306 A1* | 12/2018 | Ramalho de Oliveira | H04W 4/44 |
| 2018/0376357 A1* | 12/2018 | Tavares Coutinho | H04W 48/20 |
| 2019/0007484 A1* | 1/2019 | Chen | H04L 67/1044 |
| 2019/0009790 A1* | 1/2019 | Michalakis | B60W 50/06 |
| 2019/0017828 A1* | 1/2019 | Harish | G07C 5/085 |
| 2019/0041853 A1* | 2/2019 | Jain | G05D 1/0287 |
| 2019/0047581 A1* | 2/2019 | Bai | B60W 50/06 |
| 2019/0050718 A1* | 2/2019 | Tickoo | G06N 3/063 |
| 2019/0079802 A1* | 3/2019 | Yamaji | G06F 9/5044 |
| 2019/0120964 A1* | 4/2019 | Luo | G01S 17/87 |
| 2019/0156678 A1* | 5/2019 | Cole | G08G 1/20 |
| 2020/0050492 A1* | 2/2020 | Shifman | G06F 9/5027 |

OTHER PUBLICATIONS

U.S. Appl. No. 15/904,281—Response to Office Action dated Jun. 26, 2019 filed Sep. 19, 2019, 14 pages.

U.S. Appl. No. 15/904,281—Notice of Allowance dated Jan. 8, 2020, 26 pages.

* cited by examiner

| Instance | Data Transferred | Bandwidth |
|---|---|---|
| Local Instance | 1.13 GBytes | 162 Mbps |
| Edge Instance 1 | 1.47 GBytes | 211 Mbps |
| Edge Instance 2 | 530 GBytes | 74 Mbps |
| Cloud Instance 1 | 1.48 GBytes | 211 Mbps |
| Cloud Instance 2 | 354 GBytes | 49.3 Mbps |
| Cloud Instance 3 | 411 GBytes | 57.4 Mbps |

FIG. 4

DISTRIBUTED COMPUTING OF VEHICLE DATA BY SELECTING A COMPUTATION RESOURCE OF A REMOTE SERVER THAT SATISFIES A SELECTION POLICY FOR MEETING RESOURCE REQUIREMENTS ACCORDING TO CAPABILITY INFORMATION

BACKGROUND

Data collected on autonomous vehicles equipped with sensors is uploaded and processed in different ways. To upload data, example approaches may include physical transfer of hard disks containing the data from a vehicle to computers, moving the data from a vehicle to a network using fiber optic cables, moving the data from a vehicle to a machine with computational capabilities using a local area network, and moving the data from a vehicle to the cloud using wireless networks. However, such data transfer mechanisms are limited by both network bandwidth and the computational capabilities of various resources (e.g., computers, storage devices, etc.). Data storage is usually handled on servers primarily in an offline fashion, which avoids real-time analysis and processing capabilities.

SUMMARY

Embodiments generally relate to distributed computing of vehicle data. In some embodiments, a system includes one or more processors, and includes logic encoded in one or more non-transitory computer-readable storage media for execution by the one or more processors. When executed, the logic is operable to perform operations including: determining, at a vehicle, resource requirements for a software application; selecting a computation resource from a plurality of computation resources based on one or more selection policies for meeting the resource requirements; sending the vehicle data from the vehicle to the selected computation resource; receiving at the vehicle data from the selected computation resource; and utilizing the data obtained from the computation resource and data in the vehicle in the software application.

With further regard to the system, in some embodiments, the resource requirements include one or more of computational requirements and storage requirements. In some embodiments, the vehicle data includes location data, and the software application is a map application. In some embodiments, the vehicle data includes sensor information, and the software application is an autonomous vehicle application. In some embodiments, the vehicle data includes sensor information, and the sensor information is used to avoid traffic collisions. In some embodiments, the at least one selection policy is to select a computation resource that meets the resource requirements for the software application and has the closest virtual distance to the vehicle, and where the virtual distance is based on a number of network hops. In some embodiments, at least one selection policy is to select a computation resource that meets the resource requirements for the software application and has a closest physical distance to the vehicle. In some embodiments, at least one selection policy is to select a computation resource that meets the resource requirements for the software application and that is located within a selected geographic boundary. In some embodiments, the computation resource is not in a same physical location as the vehicle.

In some embodiments, a computer-readable storage medium carries one or more sequences of instructions thereon. When executed by one or more processors, the instructions cause the one or more processors to perform operations including: determining, at a vehicle, resource requirements for a software application; selecting a computation resource from a plurality of computation resources based on one or more selection policies for meeting the resource requirements; sending the vehicle data from the vehicle to the selected computation resource; receiving at the vehicle data from the selected computation resource; and utilizing the data obtained from the computation resource and data in the vehicle in the software application.

With further regard to the computer-readable storage medium, in some embodiments, the resource requirements include one or more of computational requirements and storage requirements. In some embodiments, the vehicle data includes location data, and where the software application is a map application. In some embodiments, the vehicle data includes sensor information, and the software application is an autonomous vehicle application. In some embodiments, at least one selection policy is to select a computation resource that meets the resource requirements for the software application and has a closest virtual distance to the vehicle, and where the virtual distance is based on a number of network hops. In some embodiments, at least one selection policy is to select a computation resource that meets the resource requirements for the software application and has a closest physical distance to the vehicle. In some embodiments, at least one selection policy is to select a computation resource that meets the resource requirements for the software application and that is located within a selected geographic boundary.

In some embodiments, a method includes determining, at a vehicle, resource requirements for a software application. The method further includes selecting a computation resource from a plurality of computation resources based on one or more selection policies for meeting the resource requirements. The method further includes sending the vehicle data from the vehicle to the selected computation resource. The method further includes receiving at the vehicle, data from the selected computation resource. The method further includes utilizing the processed data in the software application.

With further regard to the method, in some embodiments, the resource requirements include one or more of computational requirements and storage requirements. In some embodiments, the vehicle data includes location data, and where the software application is a map application. In some embodiments, the vehicle data includes sensor information, and where the software application is an autonomous vehicle application.

A further understanding of the nature and the advantages of particular embodiments disclosed herein may be realized by reference of the remaining portions of the specification and the attached drawings.

BRIEF DESCRIPTION OF THE DRAWINGS

FIG. 4 illustrates a table showing bandwidth comparison of different computation resource instances, according to some embodiments.

DETAILED DESCRIPTION

Embodiments described herein achieve distributed computing of vehicle data. In various embodiments, a system selectively sends vehicle data to one or more selected computation resources based on various selection policies. As described in more detail herein, such selection policies require a given computation resource to have capabilities to meet particular requirements of one or more software applications executed at the vehicle. Such software applications may involve vehicle data acquisition, processing, serving, monitoring, etc.

Embodiments provide a distributed computing platform where data storage, processing, and retrieval are distributed across multiple computation resources, which may include sensor data acquisition (SDA) units, edge devices, cloud servers, etc. Such computation resources may be accessed across the closest hop or layer of a network. This helps in efficiently utilizing optimal computation and bandwidth resources available at different layers in order to achieve reduced latency and optimal usage of various resources, including central processing units (CPUs), graphics processing units (GPUs), disks, memories, etc.

In some embodiments, a system on a vehicle determines resource requirements for a software application. Resource requirements may include, for example, computational capabilities, storage capacity, etc. The system selects a computation resource from various available computation resources based on one or more selection policies. Such selection policies may be directed toward determining a given computation resource's ability to meet the resource requirements. For example, if the software application at the vehicle is computation heavy, a selection policy may require a certain amount of computational power. If the software application collects a large amount of data, a selection policy may require a certain amount of storage capacity. The system sends the vehicle data from the vehicle to the selected computation resource, and subsequently receives at the vehicle, processed data from the selected computation resource. Such processed data may include, for example, vehicle data, such as location data for other vehicles in the vicinity. The system then utilizes the data obtained from the computation resource and data in the vehicle in the software application. For example, the system may display real-time traffic data to a person driving the vehicle or to an autonomous vehicle application. In another example, when the software application is an autonomous vehicle application, the system may utilize the processed data for navigation of the vehicle with the software application.

Although embodiments disclosed herein are described in the context of vehicles such as cars, the embodiments may also apply to any mobile client devices such as cell phones, wearable devices, tablets, computers, drones, augmented reality (AR) headsets, virtual reality (VR) headsets, etc.

Figure 1:
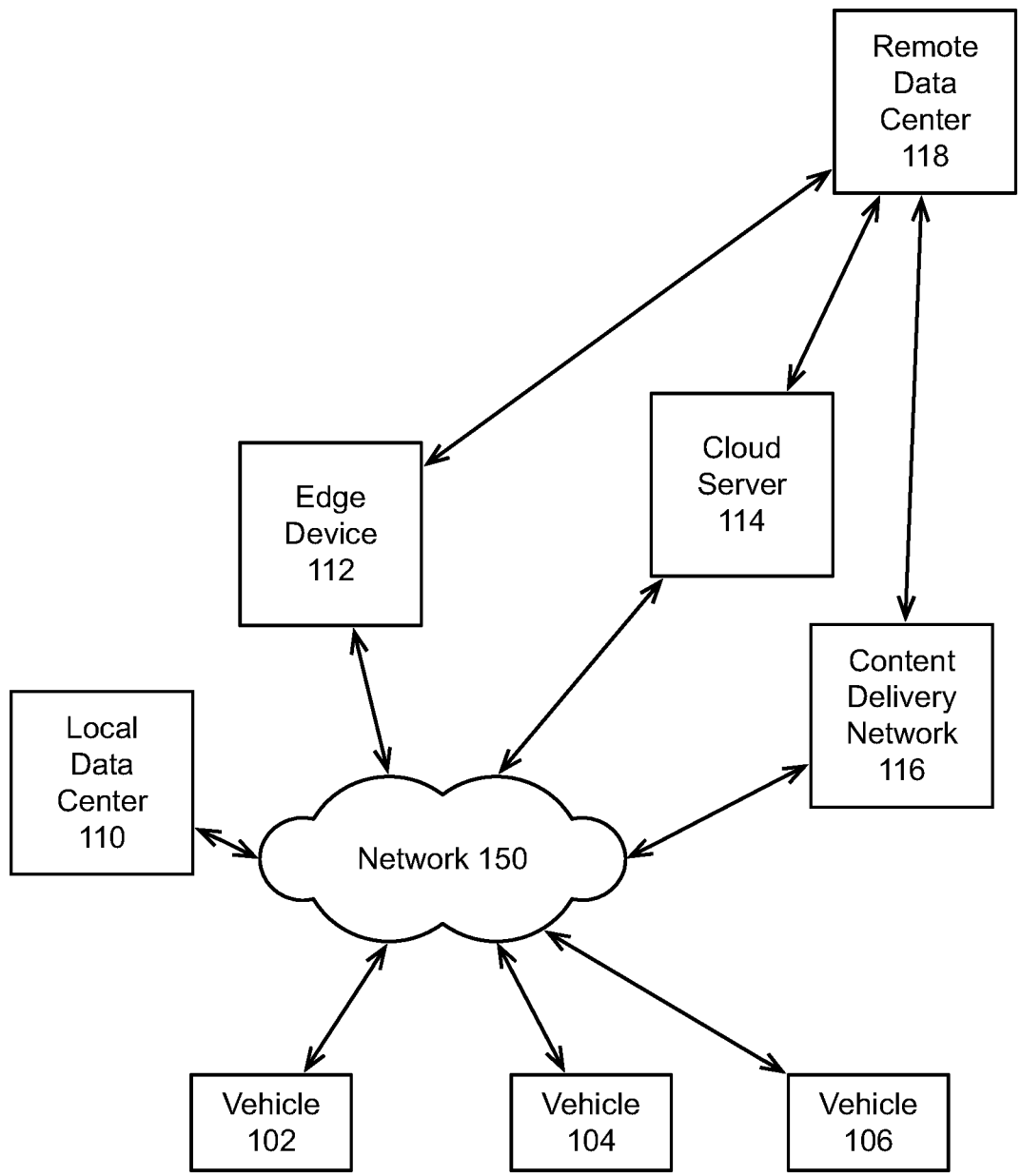
FIG. 1 illustrates a block diagram of an example network environment, which may be used for some embodiments described herein.

FIG. 1 illustrates a block diagram of an example network environment 100, which may be used for some embodiments described herein. For ease of illustration, FIG. 1 shows three blocks for vehicles 102, 104, and 106, and one block for each of local data center 110, edge device 112, cloud server 114, content delivery network 116, remote data center 118, and network 150. Blocks 102, 104, 106, 110, 112, 114, 116, 118, and 150 may represent multiple respective vehicles, computation resources, and networks. In other embodiments, network environment 100 may not have all of the components shown and/or may have other elements including other types of elements instead of, or in addition to, those shown herein.

In some embodiments, network environment 100 includes a vehicle 102 such as a car with sensors or an autonomous vehicle, etc. Network environment 100 may include multiple vehicles including a vehicle 104, a vehicle 106, etc. Also shown in network environment 100 are various types of computation resources, where each computation resource includes a collection of networked computers and storage, where the computers and storage may or may not be in the same physical location as the computation resource, and not in the same physical location as the vehicle. As shown, computation resources may include a local data center 110, an edge device 112, a cloud server 114, a content delivery network (CDN) 116, and a remote data center 118. The elements of network environment 100 of FIG. 1 may communicate via a network 150.

Autonomous vehicles are equipped with sensors that help perceive the environment surrounding the vehicle so that the vehicle safely navigates the environment. Embodiments described herein may apply to autonomous vehicles with sensors and vehicles with sensors driven by people. Vehicles may include cars, motorcycles, trucks, buses, or any transportation vehicle.

Depending on the software application, the sensor configuration for a given vehicle may change. For autonomous vehicles, sensors may include mainly perception sensors, positioning sensors, and vehicle state estimation sensors, among other sensors. Such sensors may include, for example, light detection and ranging (LiDAR) sensors, cameras, infrared cameras, radars, Doppler sensors, inertial measurement units (IMUs), global position estimation sensors including global position system (GPS) sensors, velocity sensors, odometry sensors, etc.

In various embodiments, data from the sensors are included in vehicle data that is sent from the vehicle to the selected computation resource. For example, in some embodiments, sensors may generate output data for lanes, traffic signs, etc. The sensors may detect the location and distance to lanes, traffic signs, etc. Such sensor information may be used to avoid traffic collisions. In some embodiments, logic chips such as field programmable gate arrays (FPGAs) and other on-chip solutions may be used.

Vehicles may also include sensor data acquisition units that collect data using the sensors. Such a data acquisition unit may use a computer to which the sensor is connected, or an embedded device through which sensor data is acquired. A data acquisition unit may be an on-device computing system available on the sensor hardware.

Depending on the software application, the data acquisition systems may differ in a variety of ways. For example, autonomous vehicles' sensor data acquisition may be performed using embedded computing devices, personal computers, desktops, special purpose processing units, field programmable gate arrays (FPGAs), application specific integrated circuits (ASICs), etc. In autonomous vehicles, when personal computers or desktops are not used, embedded processing units may be used. In some embodiments, the onboard processing provided by sensor manufacturers may function as the sensor data acquisition unit.

In various embodiments, a computation resource may include computing (e.g., CPUs, GPUs, etc.) and storage units (e.g., disks, memories, etc.) used for vehicle data acquisition, data storage, data processing, data serving, data monitoring, data retrieval, etc. Computation resources may include local data centers, edge devices, cloud servers, content delivery networks, remote data centers, etc. In some embodiments, a data center may be a cellular tower that has computation and/or storage capacity, where the cellular tower may function as a data center. These various types of computation resources may be distributed across one or more geographic regions.

In various embodiments, a given vehicle intelligently sends vehicle data to a computation resource that is close to the given vehicle. As described in more detail herein, being close to a vehicle may correspond to different parameters. For example, being close may include being virtually close, as in the number of network hops between the computation resource and the vehicle. If a computation resource is physically close, it may not meet the requirement of being virtually close. As such, in various embodiments, some policies may require a computation resource to be virtually close to the vehicle. If a computation resource is virtually close but not physically close, the computation resource may have a dedicated connection (e.g., fiber optic, etc.).

In some embodiments, being close may include being physically or geographically close in distance. In other words, closeness to the vehicle may be defined in multiple metrics of which the number of network hops is one metric, the physical distance is one metric, etc. Other metrics are possible. For example, closeness to the vehicle may be defined by the type or quality of connectivity between the computation resource and a vehicle. For example, a computation resource that is geographically distant from a vehicle may be virtually closer if connected via fiber optic cable. In some embodiments, a combination of network distance, network latency, physical distance, network reliability information, vehicle location and velocity, vehicle type, and other factors may be utilized to determine the data center that is close to the given vehicle.

In an example scenario, a computational resource such as local data center 110 and edge device 112 may be virtually close (e.g., within a few network hops) and physically close (e.g., in the same geographic region) close to a given vehicle (e.g., vehicle 102, etc.). Local data center 110 and edge device 112 may include computation resources close to the vehicle, base stations to which vehicle data is first sent, or bare metal computation units in the geographically close servers, etc.

Computation resources such as cloud server 114, CDN 116, and remote data center 118 may include further computation resources and servers provided either by an organization on a private network or computation resources that are located in large data centers. As shown in this example, a vehicle may exchange data directly with local data center 110, edge device 112, cloud server 114, and CDN 116. A vehicle may exchange data directly with remote data center 118 via another data center such as edge device 112, cloud server 114, and CDN 116. While remote data center 118 may be further away physically, remote data center 118 may be the closest computation resource virtually that has sufficient computation power or other required resources.

Figure 2:
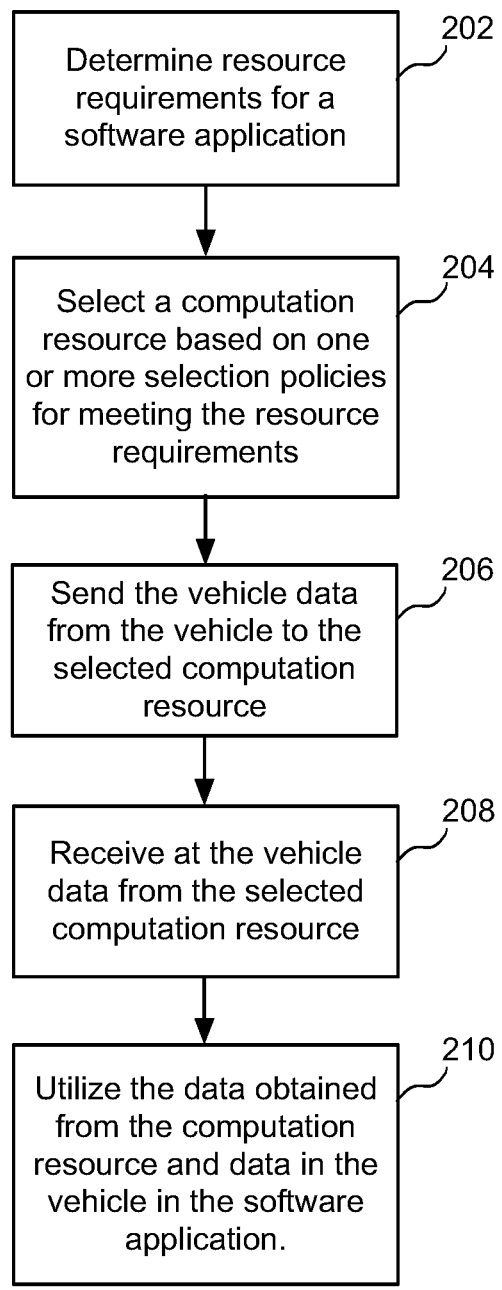
FIG. 2 illustrates an example flow diagram for processing vehicle data, according to some embodiments.

FIG. 2 illustrates an example flow diagram for processing vehicle data, according to some embodiments. Referring to both FIGS. 1 and 2, a method is initiated at block 202, where a system such as system on vehicle 102 determines resource requirements for a software application. Resource requirements may include, for example, computational capabilities, storage capacity, etc. In some embodiments, the resource requirements include one or more of computational requirements and storage requirements.

At block 204, the system selects a computation resource from various available computation resources based on one or more selection policies. Such selection policies may be directed toward determining a given computation resource's capacity to meet the resource requirements. For example, if the software application at the vehicle is computation heavy, a selection policy may require a certain amount of computational power. If the software application collects a large amount of data, a selection policy may require a certain amount of storage capacity.

At block 206, the system sends the vehicle data from the vehicle to the selected computation resource. In some embodiments, the vehicle data includes location data, where the software application is a map application. In some embodiments, the vehicle data includes sensor information, and the software application is an autonomous vehicle application.

At block 208, the system subsequently receives at the vehicle data from the selected computation resource. Such data may include, for example, vehicle data such as location data of other vehicles in the vicinity, and any relevant data required for vehicle operation.

At block 210, the system utilizes the data obtained from the computation resource and data in the vehicle in the software application. For example, in various embodiments, the system may execute software applications involving vehicle data acquisition, processing, serving, monitoring, etc.

In another example, the system may display real-time traffic data to a person driving the vehicle or to an autonomous vehicle application. In a mapping application, the application may generate preliminary information for an autonomous vehicle. For example, the application may perform three-dimensional (3D) geometric map creation, semantic map creation (which includes the semantics of the road like traffic signs, street names, lane line information or traffic signals, etc.), and may generate road network and road rules information.

In various embodiments, the process of mapping may include temporal data; spatial and data compressions on an SDA unit and edge device; inference on a vehicle device and edge device and cloud server; mapping/partial mapping on a vehicle device and an edge device and a cloud server; machine learning on a vehicle device and an edge device and a cloud server; compression on a vehicle device and an edge device and a cloud server, etc.

In some embodiments, the system utilizes multiple computation resources to which to send vehicle data and from which to receive data. For example, a given computation resource may collect, maintain, update, and provide vehicle map information for a particular area (e.g., a fixed number of blocks of a city region). As the vehicle moves across multiple areas (e.g., across a city), the system may send vehicle data to and retrieve processed map data from a number of computation resources, depending on the particular location of the vehicle. This allows faster transmit and computation times, as well as more accurate and relevant data.

As such, the embodiments provide intelligent making as to where to perform computing in the network stack. Embodiments may provide context-aware and spatially optimized data storage and retrieval, optimal bandwidth usage between different hops, leverage multiple data sources (e.g., multiple vehicles, etc.), and/or provide a platform that supports multiple input/output configurations.

Although the steps, operations, or computations have been presented in a specific order for the sake of explanation, the order of steps, operations, and/or computations may be changed in other embodiments of the invention, multiple steps shown as sequential in this specification may be performed at the same time, may not have all of the steps shown, and/or may have other steps instead of, or in addition to, those shown herein.

Figure 3:
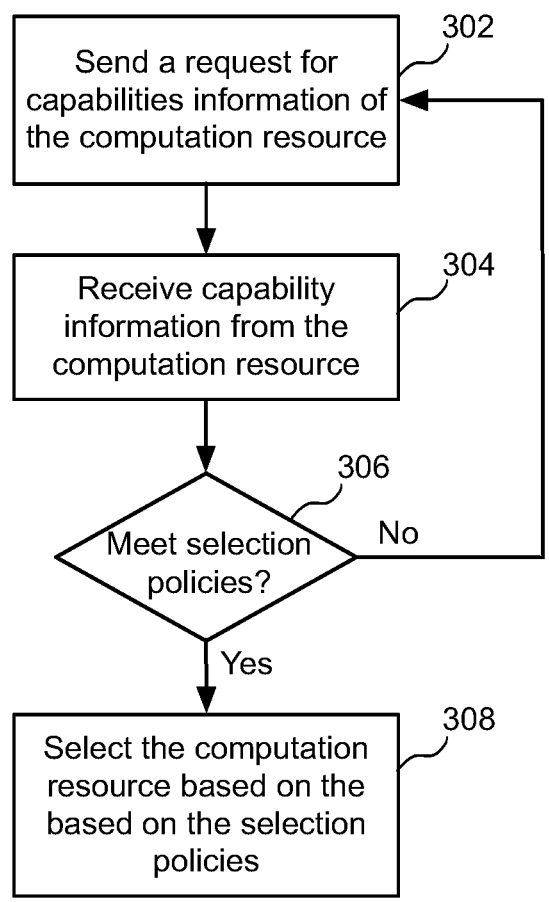
FIG. 3 illustrates an example flow diagram for selecting a computation resource for processing vehicle data, according to some embodiments.

FIG. 3 illustrates an example flow diagram for selecting a computation resource for processing vehicle data, according to some embodiments. Although the steps, operations, or computations are presented in a specific order for the sake of explanation, the order of steps, operations, and/or computations may be changed in other embodiments of the invention. In some particular embodiments, multiple steps shown as sequential in this specification may be performed at the same time. Also, some embodiments may not have all of the steps shown and/or may have other steps instead of, or in addition to, those shown herein.

Referring to both FIGS. 1 and 3, a method is initiated at block 302, where a system such as system on vehicle 102 sends to a computation resource, such as local data center 110, a request for capabilities information of the computation resource.

At block 304, the system receives capability information from the computation resource.

At block 306, the system determines if the capabilities of the computation resource meet one or more selection policies. If the capabilities do not meet the selection policy, the system sends a request for capabilities to another computation resource, at block 302.

At block 306, if the system determines that the capabilities of the computation resource meet the one or more selection policies, the system selects the computation resource based on the computation resource meeting the one or more policies.

In some embodiments, at least one selection policy is to select a computation resource that meets the resource requirements and has a closest virtual distance to the vehicle, where the virtual distance is based on a number of network hops. As such, in addition to determining if the capabilities of the computation resource meet the resource requirements of the application running on the vehicle, the system may also determine the virtual distance between the vehicle and the computation resource. If the virtual distance meets the selection policy requirement (e.g., fewest number of network hops while being capable of providing required resources), the system may then select that computation resource. In an example scenario, the software application may require a large amount of CPU or GPU computations. Such capability may be available at a remote computation resource that is two network hops away, and other computation resources that are only one network hop away may have insufficient computational resources. As such, the remote computation resource may be the optimal candidate computation resource to receive and process the vehicle data.

In some embodiments, at least one selection policy is to select a computation resource that meets the resource requirements and has the least physical distance between the computation resource and the vehicle. As such, in addition to determining if the capabilities of the computation resource meet the resource requirements of the application running on the vehicle, the system may also determine the physical distance between the vehicle and the computation resource. If the physical distance meets the selection policy requirement (e.g., computation resource with the smallest physical distance while being simultaneously capable of providing the required resources), the system may then select that computation resource. In an example scenario, the software application may require a large amount of storage capacity. For example, a given vehicle may acquire a terabyte of data in an hour. Multiplying that potential amount of data by a potentially larger number of vehicles requires a sufficiently large amount of storage capacity at a given computation resource. Such capability may be available at a local computation resource that is a network hop away, and other computation resources that may also be only one network hop away may have insufficient storage capacity. As such, the local computation resource may be the best candidate computation resource to receive and process the vehicle data. In some embodiments, a given vehicle may utilize any idle time (e.g., time parked, time at a stop light, etc.) to send vehicle data to the computation resource.

In some embodiments, at least one selection policy is to select a computation resource that meets the resource requirements and that is located within a selected geographic boundary. As such, in addition to determining if the capabilities of the computation resource meet the resource requirements of the application running on the vehicle, the system may also determine if the computation resource is in a particular geographic boundary (e.g., in the same city as the vehicle, etc.). If the computation resource distance meets this selection policy requirement, the system may then select that computation resource. In an example scenario, the software application may require mapping information. Such capability may be available at a particular computation resource. Such a computation resource may be a local data center or an edge device. As such, the local data center or the edge device may be the best candidate computation resource to receive and process the vehicle data.

Depending on the software application, a selection policy may require special resources. For example, a software application may process video requiring special video resources. In some embodiments, a content delivery network (CDN) or a special-purpose local computation resource may locally cache large amounts of data, and thus may be appropriate types of computation resources to select.

In some embodiments, if two or more computation resources meet the selection policy, the system may select the first computation resource that meets the selection policy rather than look at multiple computation resources to compare computation resources. In some embodiments, the system may request capability information from multiple computation resources and then select the optimal computation resource. The particular selection process between two or more qualifying candidate computation resources may vary, and will depend on the specific embodiment.

In some embodiments, the system may switch computation resources while the vehicle is in travel if the current computation resource becomes unavailable or circumstances at the current computation resource and/or the vehicle change substantially, compromising performance. For example, the current computation resource may start to run low on storage capacity or may be become overloaded with computational demands, etc., or the vehicle may enter into proximity with another computation resource with greater resource capacity, improved closeness to the vehicle (whether physical or virtual), etc. If another computation resource that meets the selection policy becomes available, the system may select the new computation resource and switch to the new computation resource.

The embodiments described herein facilitate a system to perform various processes such as data acquisition with an input agnostic platform, data pre-processing, compression (e.g., temporal compression, spatial compression, data compression, etc.), encryption (e.g., during upload, during serving, etc.), data slicing and upload (e.g., intelligent decision making on using computation units, optimal bandwidth utilization, etc.), machine learning (e.g., training, inference, model improvements, etc.), mapping (e.g., map building, map updating, etc.), path planning, localization, data storage (e.g., map storage, map query and serving on a client agnostic platform, context and location awareness during upload, storage, and data serving, etc.), multi-vehicle coordination, monitoring, etc.

FIG. 4 illustrates a table showing bandwidth comparison of different computation resource instances, according to some embodiments. In the following example scenario, a series of inference tests are performed with a tensor flow object detection model running inference remotely on the following servers. For ease of illustration, specific example locations are used in the examples below. The actual locations of computation resources may vary depending on the specific application.

In a local instance, in the table of FIG. 4, the location of the client device (vehicle) for the tests is in San Francisco, Calif.; and the server is local (e.g., in San Francisco, Calif.). The server configuration is 64 GB RAM, Intel Xeon CPU E5-2609 8 cores @ 1.70 GHz.

In a first edge instance, the location of the client device (vehicle) for the tests is in San Francisco, Calif., the edge device includes packet bare metal servers located in Sunnyvale, Calif. The server configuration is 1× Intel® Xeon™ E3-1240 v5 (4 cores @ 3.5 Ghz), 32 GB of DDR3-1333 ECC RAM.

In a second edge instance, the location of the client device (vehicle) for the tests is in San Francisco, Calif., the edge device includes packet bare metal servers located in Atlanta, Ga. The Configuration is 1× Intel E3-1578L (4 Physical Cores @ 2.0 GHz base/3.40 GHz burst), 32 GB of DDR3-1333 ECC RAM.

In a first cloud server instance, the location of the client device (vehicle) for the tests is in San Francisco, Calif., the cloud server is provided by a third party vendor, and cloud server is located in Northern California (e.g., US-WEST1). The configuration is 1 vCPU, 3.75 GB memory.

In a second cloud server instance, the location of the client device (vehicle) for the tests is in San Francisco, Calif., the cloud server is provided by a third party vendor, and cloud server is located in Ireland (e.g., EU-WEST-1). The configuration is 1 vCPU, 3.75 GB memory.

In a third cloud server instance, the location of the client device (vehicle) for the tests is in San Francisco, Calif., the cloud server is provided by a third party vendor, and cloud server is located in London (e.g., EU-WEST-2). The configuration is 8 vCPU, 32 GB memory.

FIG. 4 shows the results of a baseline network bandwidth comparison test. In this example, the data used includes 290 test images, and a sample input image and image with car detection. Also, a tensor flow model is used. The test runs a network performance measurement and tuning tool over transmission control protocol (TCP) for 1 minute between the client device (vehicle) and various machines (e.g., 128 Kbyte TCP Window Size).

As shown, the second edge instance (in Sunnyvale) and the first cloud instance (in California) have similar bandwidth availability, whereas the farther servers limit the bandwidth availability. Such an example test indicates that for location specific applications (such as processing data and serving maps and other information to autonomous cars) using a combination of edge and cloud processing is beneficial.

In another example test for inference latency comparison on different servers, different servers are used. Images are uploaded and processed where the task is to detect cars. The tensor flow model running on the edge device and cloud server instances is used to perform inference. This test is designed to simulate the image upload and inference task in realtime for autonomous cars. The latencies obtained when edge instances were used is significantly smaller than the latencies obtained from the closest cloud instance with similar hardware configurations.

Embodiments described herein provide various benefits. For example, embodiments achieve efficient and reliable autonomous vehicle navigation, in an automated, real-time and context aware manner. As the number of active autonomous vehicles grow, embodiments facilitate data handling processes and infrastructure to cater to large quantities of data being generated by the sensor suites on vehicles (autonomous vehicles and driven vehicles). In order to solve the challenges in data acquisition, processing, and monitoring, embodiments described herein provide a computing platform that intelligently distributes the workload and optimally utilizes the available computation resources and bandwidth, etc.

Figure 5:
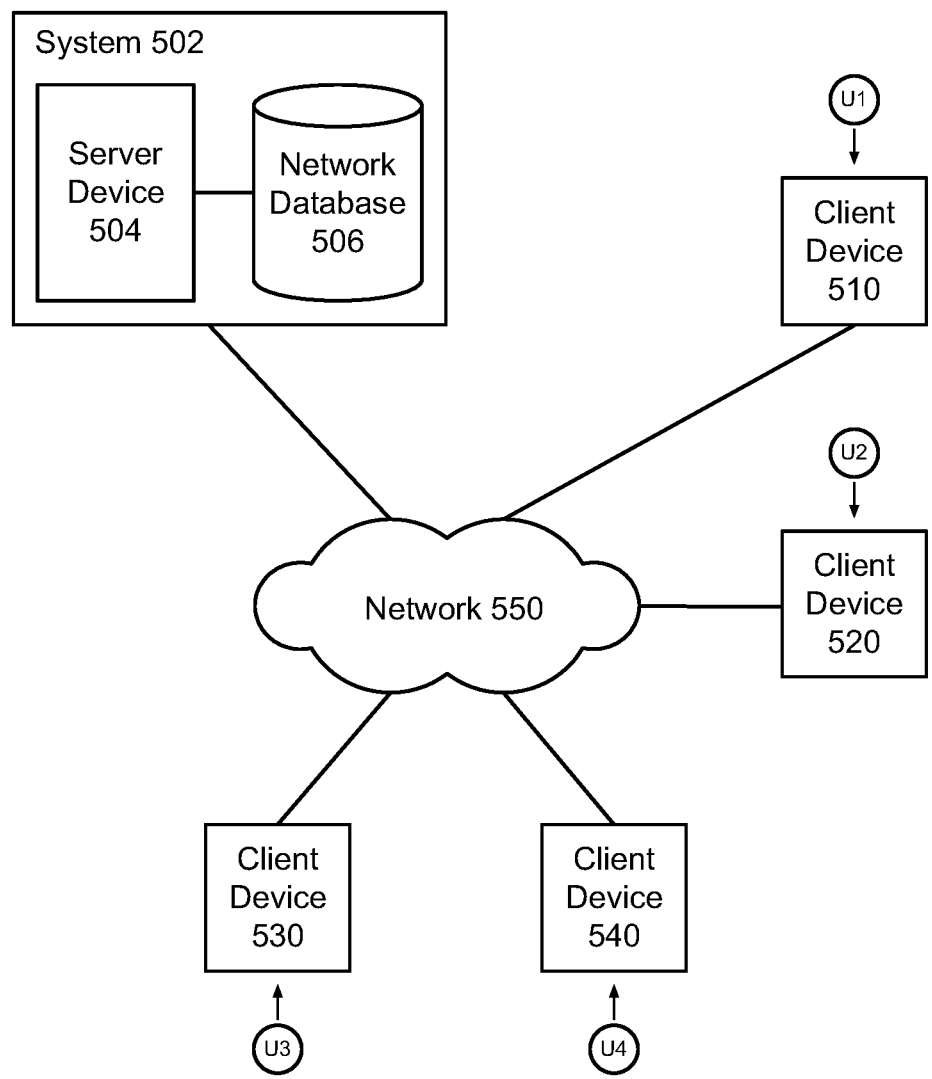
FIG. 5 illustrates a block diagram of an example network environment, which may be used for some embodiments described herein.

FIG. 5 illustrates a block diagram of an example network environment 500, which may be used for some embodiments described herein. In some embodiments, network environment 500 includes a system 502, which includes a server device 504 and a network database 506. Network environment 500 also includes client devices 510, 520, 530, and 540, which may communicate with each other directly or via system 502. Network environment 500 also includes a network 550.

For ease of illustration, FIG. 5 shows one block for each of system 502, server device 504, and network database 506, and shows four blocks for client devices 510, 520, 530, and 540. Blocks 502, 504, and 506 may represent multiple systems, server devices, and network databases. Also, there may be any number of client devices. In other embodiments, network environment 500 may not have all of the components shown and/or may have other elements including other types of elements instead of, or in addition to, those shown herein. In various embodiments, users U1, U2, U3, and U4 may be passengers in autonomous vehicles and/or drivers of regular vehicles.

In the various embodiments described herein, a processor of system 502 and/or a processor of any client device 510, 520, 530, and 540 causes the elements described herein (e.g., information, etc.) to be displayed in a user interface on one or more display screens.

Embodiments may apply to any network system and/or may apply locally for an individual user. For example, embodiments described herein may be implemented by system 502 and/or any client device 510, 520, 530, and 540. System 502 may perform the embodiments described herein on a stand-alone computer, tablet computer, smartphone, etc. System 502 and/or any of client devices 510, 520, 530, and 540 may perform embodiments described herein individually or in combination with other devices.

Figure 6:
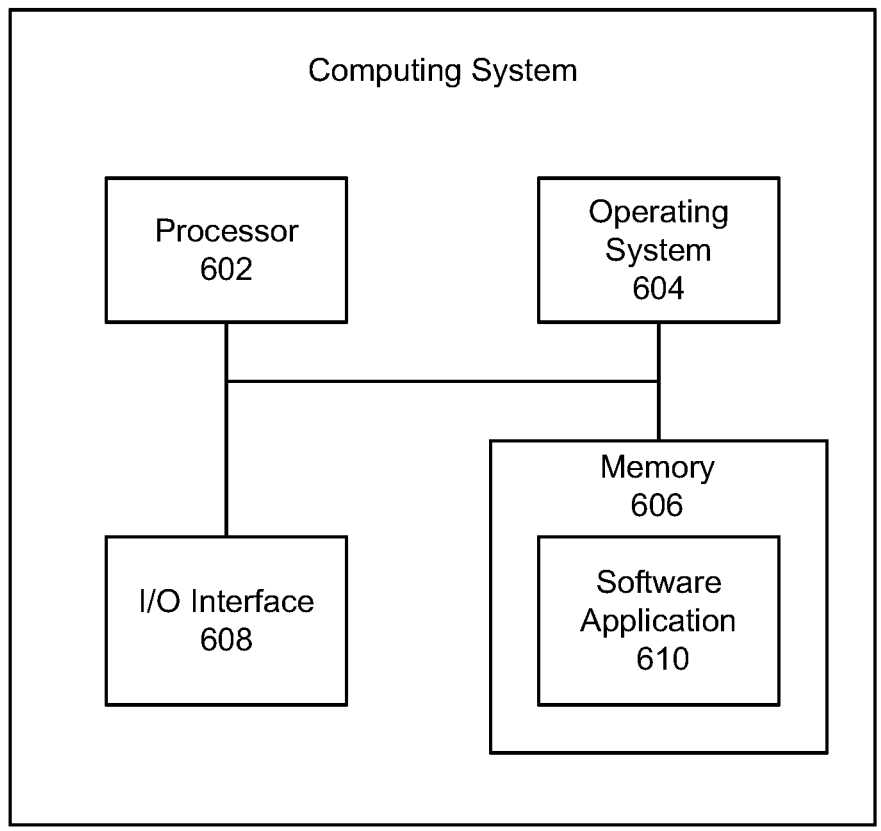
FIG. 6 illustrates a block diagram of an example computing system, which may be used for some embodiments described herein.

FIG. 6 illustrates a block diagram of an example computing system 600, which may be used for some embodiments described herein. For example, computing system 600 may be used to implement computing systems of vehicles 102, 104, and 106, and computation resources such as local data center 110, edge device 112, cloud 114, content delivery network 116, and remote data center 118 of FIG. 1, and server device 504 of FIG. 5, as well as to perform embodiments described herein. In some embodiments, computing system 600 may include a processor 602, an operating system 604, a memory 606, and an input/output (I/O) interface 608. For ease of illustration, FIG. 6 shows one block for each of processor 602, operating system 604, memory 606, I/O interface 608, and software application 610. These blocks 602, 604, 606, 608, and 610 may represent multiple processors, operating systems, memories, I/O interfaces, and software applications. In various embodiments, computing system 600 may not have all of the components shown and/or may have other elements including other types of components instead of, or in addition to, those shown herein.

In various embodiments, processor 602 may be used to implement various functions and features described herein, as well as to perform the method embodiments described herein. While processor 602 is described as performing embodiments described herein, any suitable component or combination of components of computing system 600 or any suitable processor or processors associated with computing system 600 or any suitable system may perform the steps described. Embodiments described herein may be carried out on a user device, on a server, or a combination of both.

Computing system 600 also includes a software application 610, which may be stored on memory 606 or on any other suitable storage location or computer-readable medium. Software application 610 provides instructions that enable processor 602 to perform the embodiments described herein and other functions. Software application may also include an engine such as a network engine for performing various functions associated with one or more networks and network communications. The components of computing system 600 may be implemented by one or more processors or any combination of hardware devices, as well as any combination of hardware, software, firmware, etc.

Although the description has been described with respect to particular embodiments thereof, these particular embodiments are merely illustrative, and not restrictive. Concepts illustrated in the examples may be applied to other examples and embodiments.

In various embodiments, software encoded is in one or more non-transitory computer-readable media for execution by one or more processors. The software when executed by one or more processors is operable to perform the embodiments described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the embodiments described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
a vehicle computing system including one or more processors; and
logic encoded in one or more non-transitory computer-readable storage media for execution by the one or more processors and when executed operable to perform operations comprising:
determining, at the vehicle computing system of a vehicle, resource requirements for a software application;
requesting from each remote server of a plurality of remote servers, capability information corresponding to one or more selection policies for meeting the resource requirements, wherein the resource requirements are associated with computational requirements of the remote servers and wherein the capability information is requested by the vehicle computing system of the vehicle;
identifying two or more remote servers, of the plurality of remote servers, that satisfy the one or more selection policies for meeting the resource requirements according to the capability information received from each remote server;
selecting a computation resource of a remote server, of the identified two or more remote servers, that is optimal according to the capability information;
sending vehicle data from the vehicle computing system to the selected computation resource of the remote server for processing;
receiving, at the vehicle computing system, data from the selected computation resource; and
utilizing the data obtained from the selected computation resource and data in the vehicle in the software application.

2. The system of claim 1, wherein the resource requirements include storage requirements of the remote servers.

3. The system of claim 1, wherein the vehicle data includes location data, and wherein the software application is a map application.

4. The system of claim 1, wherein the vehicle data includes sensor information, and wherein the software application is an autonomous vehicle application.

5. The system of claim 1, wherein the vehicle data includes sensor information, and wherein the sensor information is used to avoid traffic collisions.

6. The system of claim 1, wherein at least one selection policy is to select a computation resource that meets the resource requirements for the software application and has a closest virtual distance to the vehicle, wherein the virtual distance is based on a number of network hops.

7. The system of claim 1, wherein at least one selection policy is to select a computation resource that meets the resource requirements for the software application and that has a closest physical distance to the vehicle.

8. The system of claim 1, wherein at least one selection policy is to select a computation resource that meets the resource requirements for the software application and that is located within a selected geographic boundary.

9. The system of claim 1, wherein the computation resource is not in a same physical location as the vehicle.

10. The system of claim 1, wherein the computation resource of the remote server is selected based on two or more selection policies for meeting the resource requirements and data information associated with data received from at least one data source, wherein the two or more selection policies are associated with two or more of location constraints related to the remote servers, time constraints associated with the data received from the at least one data source, and data type constraints related to the remote servers.

11. The system of claim 1, the operations further comprising:
receiving a notification that the selected computation resource of the selected computational resource of the remote server is running low on storage capacity or is becoming overloaded with computational demands;
selecting another computation resource of another remote server, of the plurality of remote servers, that satisfies the one or more selection policies for meeting the resource requirements according to the capability information; and
sending at least a portion of the vehicle data from the vehicle computing system to the other selected computation resource.

12. A non-transitory computer-readable storage medium with program instructions stored thereon, the instructions when executed by one or more processors cause the one or more processors to perform operations comprising:
determining, at a vehicle computing system of a vehicle, resource requirements for a software application;
requesting, from each remote server of a plurality of remote servers, capability information corresponding to one or more selection policies for meeting the resource requirements, wherein the resource requirements are associated with computational requirements of the remote servers and wherein the capability information is requested by the vehicle computing system of the vehicle;
identifying two or more remote servers, of the plurality of remote servers, that satisfy the one or more selection policies for meeting the resource requirements according to the capability information received from each remote server;
selecting a computation resource of a remote server, of the identified two or more remote servers, that is optimal according to the capability information;
sending vehicle data from the vehicle computing system to the selected computation resource of the remote server for processing;
receiving, at the vehicle computing system, data from the selected computation resource; and
utilizing the data obtained from the selected computation resource and data in the vehicle in the software application.

13. The non-transitory computer-readable storage medium of claim 12, wherein the resource requirements include storage requirements of the remote servers.

14. The non-transitory computer-readable storage medium of claim 12, wherein the vehicle data includes location data, and wherein the software application is a map application.

15. The non-transitory computer-readable storage medium of claim 12, wherein the vehicle data includes sensor information, and wherein the software application is an autonomous vehicle application.

16. The non-transitory computer-readable storage medium of claim 12, wherein at least one selection policy is to select a computation resource that meets the resource requirements for the software application and has a closest virtual distance to the vehicle, and wherein the virtual distance is based on a number of network hops.

17. The non-transitory computer-readable storage medium of claim 12, wherein at least one selection policy is to select a computation resource that meets the resource requirements for the software application and that is located within a selected geographic boundary.

18. A computer-implemented method for processing vehicle data, the method comprising:

determining, at a vehicle computing system of a vehicle, resource requirements for a software application;

requesting, from each remote server of a plurality of remote servers, capability information corresponding to one or more selection policies for meeting the resource requirements, wherein the resource requirements are associated with computational requirements of the remote servers and wherein the capability information is requested by the vehicle computing system of the vehicle;

identifying two or more remote servers, of the plurality of remote servers, that satisfy the one or more selection policies for meeting the resource requirements according to the capability information received from each remote server;

selecting a computation resource of a remote server, of the identified two or more remote servers, that is optimal according to the capability information;

sending vehicle data from the vehicle computing system to the selected computation resource of the remote server for processing;

receiving, at the vehicle computing system, data from the selected computation resource; and utilizing the data obtained from the selected computation resource and data in the vehicle in the software application.

19. The computer-implemented method of claim 18, wherein the resource requirements include storage requirements of the remote servers.

20. The computer implemented method of claim 18, wherein the vehicle data includes location data, and wherein the software application is a map application.

21. The computer implemented method of claim 18, wherein the vehicle data includes sensor information, and wherein the software application is an autonomous vehicle application.

* * * * *